July 15, 1947.　　　J. L. REYNOLDS　　　2,423,995
PNEUMATIC TIRE
Filed Jan. 6, 1944　　　2 Sheets-Sheet 1

Inventor
Julian Louis Reynolds
By Bacon & Thomas
Attorneys

July 15, 1947.    J. L. REYNOLDS    2,423,995
PNEUMATIC TIRE
Filed Jan. 6, 1944    2 Sheets-Sheet 2

Inventor
Julian Louis Reynolds
By Bacon & Thomas
Attorneys

UNITED STATES PATENT OFFICE 2,423,995

PNEUMATIC TIRE

Julian L. Reynolds, Richmond, Va.

Application January 6, 1944, Serial No. 517,236

8 Claims. (Cl. 152—359)

This invention relates to a rubber structure and more particularly to a resilient rubber structure in which metal filaments having high heat conductivity are employed in the body of the structure to distribute heat generated by flexing and internal friction in portions thereof substantially throughout the structure so that said heat can be readily dissipated through the walls of the structure and to any metal members in contact with the structure.

The invention has particular utility in pneumatic tire structures and will be specifically described in connection, therewith. The use of metal wires and cables in the construction of pneumatic tire structures has been suggested, primarily for reinforcement of such tires. However, in the prior art structures, comparatively heavy round cables or wires have been employed, so that the surfaces available for collecting heat from the rubber or fabric portions of the tire have been relatively small compared to the weight and volume of metal used. This, coupled with the fact that such wires or cables have been made of iron or steel, which has relatively poor heat conductivity, has rendered negligible the actual dispersion of heat in the tire and loss of heat from the tire due to the use of metal in such prior structures. Furthermore, the relatively heavy cables or wires set up strains in the tire structure when the tire is rapidly stressed which cause distortion of the rubber or fabric portions of the tires to an extent generating even more heat than was dissipated due to the metal incorporated into the tire. The heating, in conjunction with the large stresses adjacent the relatively inflexible wires or cables of the prior art, has caused separation of the rubber from the metal strands and breaking of the strands resulting in premature failure of the tire.

In accordance with the present invention, very thin flat strips or filaments presenting large surfaces of metal are incorporated into tire structures in a manner which prevents the undue stresses referred to above. The thin metal strips or filaments employed in the present invention present large surface areas to the resilient material of the tire for the efficient transfer of heat to the filaments. Also, the thin metal filaments are preferably made of a highly heat conductive material and are positioned in the tire so as to conduct heat away from the areas of greatest heat generation. Of the high heat conductive metals, aluminum or aluminum alloys are preferred, as certain of the high heat conducting metals, for example copper, have a deleterious effect upon the rubber, which is entirely absent when aluminum is employed.

The flat metal filaments of the present invention may be employed in various forms, either alone or in combination with fabric or other filaments, to produce structurally strong tires having the heat dispersion qualities above discussed. Preferably the metal filaments extend continuously from one bead of the tire to the other bead and into relatively close proximity to the metal cables or wires conventionally employed in such beads, so that heat generated in any portion of the tire is conducted to substantially all portions of the tire and to the bead cables, which are positioned quite close to the metallic rim upon which the tire is mounted in use. Not only is heat dissipated by radiation and convection from substantially the entire outer surface area of the tire, but is also conducted in a large measure to the rim or wheel upon which the tire is mounted to be dissipated therefrom.

It is, therefore, an object of the present invention to provide an improved rubber structure having high heat dispersing and dissipating qualities.

Another object of the invention is to provide an improved tire structure embodying a plurality of thin filaments of a high heat conducting metal distributed throughout the body portion of the tire.

Another object of the invention is to provide an improved tire structure in which thin flat filaments of a high conducting material are employed in the body of the tire to present large surface areas of such heat conducting material to the rubber and fabric portions of the tire so as to readily receive heat generated in such portions and distribute the same throughout the tire, thus lowering the average temperature of the tire and providing for heat dissipation from substantially the entire surface of the tire.

Another object of the invention is to provide an improved tire structure in which a flexible high heat conducting metal is distributed in thin flat filaments so that the primary bending of the filaments when the tire is in use is along lines parallel to the broader surfaces of said filaments.

A further object of the invention is to provide an improved tire fabric or cord structure containing thin flat filaments of a flexible metal having high heat conductivity.

A still further object of the invention is to provide an improved tire fabric having high strength and high heat conductivity whereby such fabric provides reinforcement for the tire and at the same time provide for rapid dissipation of heat from the tire.

Other objects and advantages of the invention will appear in the following description of preferred embodiments thereof given in connection with the attached drawing, in which.

Figure 1:
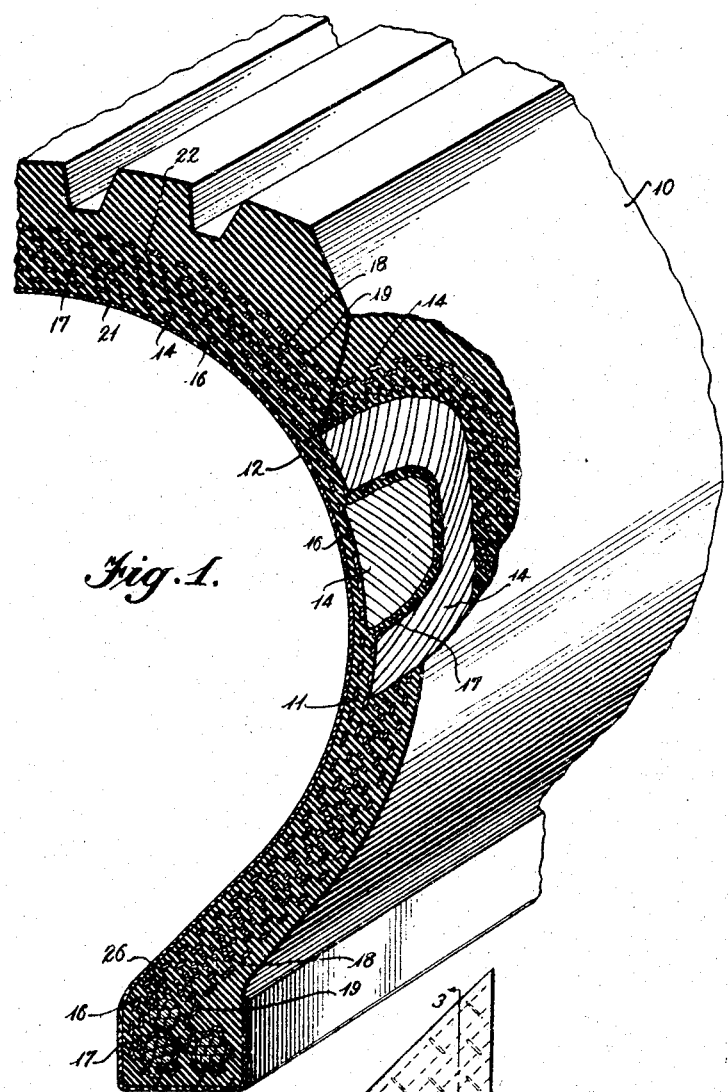
Figure 1 is an isometric sectional view of part of a pneumatic tire casing with certain portions broken away to show the inner construction.

Referring more particularly to the drawings, the tire of Figure 1 may have the usual tread portion 10, a body portion 11 provided with an inner fabric lining 12 and bead portion 13. A plurality of thin flat metal filaments or strips 14 may be incorporated in the body portion of the tire including the portion underlying the tread portion 10. In the embodiment of the invention shown in Figure 1, four layers of the metallic filaments 16, 17, 18 and 19 are shown, although it will be apparent from the following description that the metallic filaments may be variously distributed throughout the body portion of the tire. As further shown in Figure 1, the metallic filaments may be laid helically of the tire body, for example, the filaments 14 of the layer 16 may extend in one direction from one bead to the other bead, while the filaments 14 of the layer 18 may be positioned substantially at right angles to the filaments 14 of the layer 16 so as to extend helically in the other direction from one bead of the tire to the other. It will be understood that the layers 18 and 19 may be arranged relative to each other in substantially the same manner.

One advantageous manner of constructing a tire having metallic filaments therein is to additionally employ layers 21 and 22 of conventional textile cords such as cotton or rayon interspersed between the layers of metallic filaments. It is advantageous to have the layers of metal filaments, if employed in conjunction with layers of textile filaments, positioned adjacent the inner and outer surfaces of the tire, although various other arrangements of textile cords and metal filaments may be employed as will hereinafter appear. It is also advantageous to bring the ends of the metallic filaments into close proximity with the conventional metallic wires or cables in the beads 13 of the tire. As shown in Figure 1, the ends of the metallic filaments in layers 16 and 17 may be wrapped around the cable 23 and the ends of the metallic filaments in layers 18 and 19 may be wrapped around the cable 24, the ends of the textile cords in the layers 21 and 22 being wrapped around the cable 26. This type of structure brings the metallic filaments into close proximity with the cables 23, 24 and 26 so that heat is readily transmitted to the cables and thus readily distributed throughout the bead 13. Since the bead 13 is ordinarily positioned in contact with a metallic rim or wheel of relatively large surface area, heat is effectively transferred from the body of the tire through the metallic filaments to the bead cables and to the rim or wheel structure from which it is rapidly dissipated.

Figure 2:
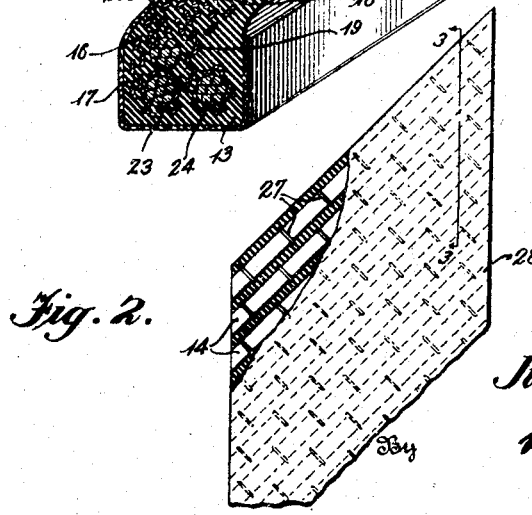
Figure 2 is a fragmentary view of a tire fabric in accordance with the present invention.
Figure 3:
Figure 3 is a vertical section taken on an enlarged scale taken on the line 3—3 of Figure 2.

A preferred manner of incorporating the filaments into a tire is apparent from Figure 2 which is a fragmentary view of a bias fabric similar to that conventionally employed in making cord tires. The metallic filaments 14 may, if desired, be held in position during fabrication of the tire by a plurality of small transverse threads 27 and, as shown in Figure 3, this entire structure may be coated and bound together with a rubber or similar composition 28 which becomes an integral portion of the tire when the bias structure shown in Figure 3 is employed in building the tire. The auxiliary transverse threads 27 of Figure 2, in general, serve no useful purpose in the tire and may be omitted, if desired, the rubber composition of Figure 3 being relied upon for holding the metallic filaments in position during fabrication of the tire. The rubber composition 28 of Figure 3 may be applied in any known or suitable manner, such as frictioning on a calendar, dipping in rubber solutions or in latex, etc.

Figure 4:
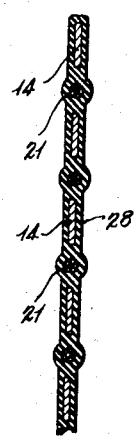
Figure 4 is a figure similar to Figure 3 showing a modified tire fabric structure.
Figure 5:
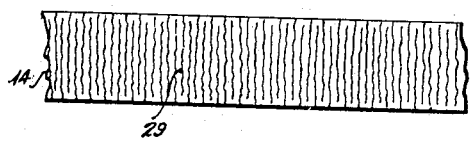
Figure 5 is a fragmentary plan view on an enlarged scale of a metallic filament showing creping of the filament in accordance with one modification of the present invention.
Figure 6:
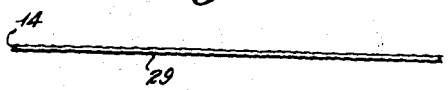
Figure 6 is an elevation of the filament of Figure 5.

In order to more uniformly distribute the metallic filaments throughout the tire, the bias fabric structure of Figure 4 may be employed. This structure includes both metallic filaments 14 and textile cords 21 coated with a rubber composition 28. Such a fabric composition may be employed for all or any portion of the fabric structure of the tire, and combines high strength properties with high heat dispersing properties. It will be apparent that the number of metallic filaments relative to the number of textile cords in the fabric employed in a given tire may be varied depending upon the amount of heat necessary to be dissipated. In order to impart increased flexibility to the thin metallic filaments of the structures of the present invention, any of the metallic filaments may be creped as indicated at 29 in Figures 5 and 6. Such creped filaments have increased bonding qualities for rubber compositions and in addition provide for resiliency of the metallic filament in a direction longitudinally of the filament.

Figure 7:
Figure 7 is a cross section of a further modified filament on a greatly enlarged scale.

In the structures thus far described, the primary purpose of the metallic filaments is heat distribution, reliance being had primarily upon conventional textile cords for reinforcement of the tire. It will be understood, however, that thin flat filaments may be employed of sufficient thickness to provide substantial reinforcement for the tire while still retaining such filaments very thin as compared to prior structures employing metallic wires or cables. This is particularly true if the metallic filaments of the present invention are made of high strength aluminum alloys, which alloys, in general, retain high heat conductive properties as compared to iron or steel filaments. For extremely heavy tires, either solid or pneumatic, it is sometimes advantageous to employ a thin composite filament made up of an iron or steel core 31 as shown on a greatly enlarged scale in Figure 7, the core 31 being surrounded by a coating 32 of high heat conductive metal such as aluminum, the coating being applied to the core 31 in any desired manner, such as by dipping in molten aluminum or by applying aluminum foil to the surfaces of the core 31. Such structures incorporate both the high strength properties of such materials as iron or steel along with the high heat conductive properties of aluminum or similar high heat conductive metal. It will be understood that composite filaments such as shown in Figure 7 may be employed as the metallic filament in any of the structures of the present invention.

Figure 8:
Figure 8 is a fragmentary view on an enlarged scale of a composite cord employing both textile and metallic filaments.
Figure 9:
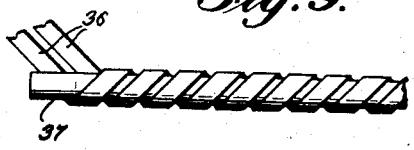
Figure 9 is a view similar to Figure 8 showing a further modified cord.
Figure 10:
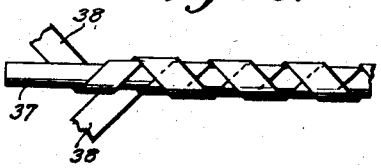
Figure 10 is a view similar to Figure 8 showing a further modified cord.

Another manner of incorporating the thin metallic filaments of the present invention into tire structures is shown in Figure 8, in which a flat metallic filament 33 is spirally wrapped around a cord 34 which may be of any textile material such as cotton or rayon suitable for employment in tire structures. As shown in Figure 9, a plurality of metallic filaments 36 may be wrapped around a cord core 37 to produce a composite cord similar to that shown in Figure 8. The metallic filaments 36 of Fig. 9 are shown as being wrapped parallel in Figure 9, but as shown in Figure 10, metallic filaments 38 may be wrapped helically in opposite directions around a core 37. The cores 37 of Figures 9 and 10 are shown as solid cores made of plastic material such as rubber or certain synthetic resins. If the core 37 is made of rubber, it becomes integrally incorporated into the tire when the composite cord of Figures 9 and 10 is woven into a bias fabric such as shown in Figs. 2 to 4 and then incorporated into a tire such as shown in Figure 1. During curing of the tire, the rubber of the body portion of the tire becomes integrally bonded with the rubber of the core 37 so as to leave the helical coils of the metallic filaments 38 positioned in the tire structure. In general, cords such as shown in Figures 9 and 10 with a rubber core are employed in conjunction with textile cords either in separate layers as shown in Figure 1 or intermingled by employing a fabric such as shown in Figure 4. The textile cords in such structure may also be of the type shown in Figure 8 having metallic filaments helically wrapped therearound.

It will be apparent that one or more metallic filaments may be employed in any of the constructions of Figures 8 to 10, and that the metallic filament may completely cover the core although it is advantageous to leave substantial portions of the cord core uncovered so that the rubber of the tire body may bond to or penetrate into the core. A particularly advantageous construction of the cords of Figures 9 and 10 is to use high tensile strength plastics which are available at the present time, such as rubber plasticized styrene; plasticized ethyl cellulose; plasticized polyvinyl butyral; various copolymers of polyvinyl compounds such as the acetate or chloride; regenerated cellulose; cellulose acetate; "nylon," etc. Such cores may be either solid cores such as shown in Figures 9 and 10, or cores made up of a plurality of woven or twisted fine filaments to provide a structure such as that shown in Figure 8. Such plastic materials have extremely high tensile strength and high resistance to flexing. Any of the composite cord structures of Figures 8 to 10 having a high tensile strength core such as a textile fabric core or high tensile strength plastic core in conjunction with a thin flat metallic filament may be employed as the sole reinforcing elements in a tire, or may be employed in conjunction with layers of conventional textile cords or interspersed with such textile cords in the manner show in Figure 4.

Figure 11:
Figure 11 is a view similar to claim 8 showing a further modified type of cord or cable.

By making the cords of Figures 8 to 10 of very small size, a plurality of such cords can be employed to form a multistrand cord such as shown in Figure 11. Thus a plurality of cords 39 wrapped around a central core 41 or twisted without a central core may be employed as the cord elements of a bias fabric such as that shown in Figure 2. By employing high tensile strength metallic cores in the cords of Figures 8 to 10, inclusive, about which metallic filaments of high heat conductivity metal are wrapped, high heat conducting cables having high tensile strength can be constructed for use as bead cables such as those shown at 23, 24 and 26 in Figure 1. Thus the structure of Figure 11, in small sizes and having flexible cores in the various cords 39, may be employed as the reinforcing elements extending through the body of the tire while large size cord elements 39 employing high tensile strength metallic cores may be employed for the bead cables.

Figure 12:
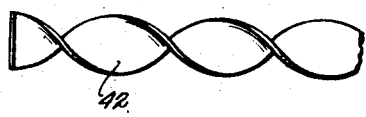
Figure 12 is a fragmentary view showing another manner of employing the metal filaments of the present invention.

A further modified manner of employing flat metallic filaments having a large surface area is illustrated in Figure 12, wherein a single element 42 is twisted about its longitudinal axis to produce a metallic filament which has increased longitudinal resilience. Such a twisted filament as shown in Figure 12 may be employed, in part or in whole, as the filaments or cords in a friction fabric such as shown in Figure 2, so that the twisted filaments run helically from one bead to the other in a tire constructed with such a bias fabric. Relatively tightly twisted filaments of small size of the type shown in Figure 12 can also be used to make up a multistrand cord such as that shown in Figure 11, which multistrand cord is suitable for incorporation into a bias fabric such as that shown in Figure 2 in order to enable the multistrand cord to be incorporated into a tire.

Figure 13:
Figure 13 is a cross section on a greatly enlarged scale of a metallic filament coated with an adhesive material useful in securing a better bond to the rubber composition of a tire.

One of the difficulties encountered in prior attempts to employ metallic strands in tires has been the failure to secure a satisfactory bond between the metal and the rubber. In certain structures contemplated by the present invention, wherein the metallic filaments are interspersed with textile cords, this failure to secure high bonding strength between the strand and the rubber is not of extreme importance, since in such cases the textile cords are primarily relied upon for tire reinforcement. Nevertheless, a good bond between the rubber and the metal even in such cases is desirable, as the metal does to some extent assist in reinforcing the tire and high bonding efficiency insures good contact between the metal and the rubber, thus increasing heat transference to the metal. Also, in certain constructions according to the present invention, it is desired to have the metal provide at least a portion of the reinforcing action. In order to secure such a bond, it is advantageous to initially coat the metal filaments with a material which adheres both to metal and rubber. In Figure 13, a metal filament 43 is shown on a greatly enlarged scale as being provided with a coating 44, the thickness of which is exaggerated for purposes of illustration. It is to be understood that all of the metallic filaments in the various structures illustrated may be coated with such a bond-promoting material in a very thin coat. Many of the thermoplastic resins, such as those mentioned above as usable for core structures in Figures 8 to 10, as well as halogenated rubber such as chlorinated rubber, increase the bonding efficiency between rubber and metal and may be employed for this purpose. The same is true of most thermosetting resins, the phenol or creosol aldehyde resins in general providing the best bonding efficiency. A preferred construction of the present invention is, therefore, to subject the metallic filaments of the present invention to a coating operation with a phenol or creosol aldehyde resin prior to incorporating the same into a tire fabric or tire structure. This can be accomplished by employing a partially reacted resin which is soluble in an organic solvent and the coating may be carried out by dipping or spraying the filaments with a resin solution in any known or suitable manner. Upon evaporation of the solvent, a thin coating of unreacted resin is left upon the surfaces of the filament and, upon incorporation of the filaments into a tire structure, the thermosetting resin is cured simultaneously with the rubber of the tire during vulcanization thereof to provide a bond of high tensile strength between the rubber and the metal filament. The other bond promoting materials such as the thermoplastic resins, or halogenated rubber, may be applied to the filaments in substantially the same manner, or where the materials are capable of being melted, they can be applied in molten form. The coatings of bond promoting materials, not only increase bonding efficiency between the filaments and the rubber, but, in general, materially increase the tensile strength of the filaments themselves, this being particularly true when coatings of rubber or polyvinyl butyral or other high tensile strength plastics are employed.

In any of the structures above described the thickness of the flat metallic filament employed will vary with the size of the tire and the degree to which reliance is had on the metallic film for tire reinforcement. Thus thin flat metallic filaments having thicknesses ranging from approximately .00015 to .01 inch in thickness are contemplated. The large surface areas which can be obtained will be apparent from the fact that 1 lb. of aluminum rolled to a caliper of .00017 inch will yield approximately 60,000 square inches of metal or 120,000 square inches of surface. The thicker filaments are employed in the heavier structures such as truck tires and where the metal is relied upon to take at least a portion of the reinforcing stress. A thinner material is employed in conjunction with other types of stress absorbing members such as textile cords, the filaments either being distributed in the tire as shown in Figures 1 to 4 and 12, or as a part of a composite cord as shown in Figures 8 to 11. The width of such thin flat filaments will also vary but will usually be in the neighborhood of $\frac{1}{64}$ to $\frac{1}{4}$ of an inch.

The thin flat metallic filaments preferably employed in the present invention may be made in any desired manner such as by flattening thin wire under pressure, for example by running the same between rolls or sheets of thin metal may be rolled and then slitted.

For heat dispersing properties aluminum is preeminently suitable since it is very good conductor of heat and is exceeded in conductivity only by copper, silver and gold. The conductivity of aluminum at 100° C. through a plate 1 cm. thick, across an area of 1 cm.$^2$ is .49 calorie per second where the difference in temperature is one degree, whereas the heat conductivity of pure copper on the same basis is .908, that of silver is .992, and that of gold is .703. The heat conductivity of iron and steel upon the same basis varies from about .1 to .16. These heat conductivities are very nearly correct for any usual tire temperature. On a weight basis, which is probably even more important, the ratio of heat conductivity of aluminum to copper is approximately 1.8, the same ratio with respect to silver is approximately 1.9, and with respect to gold is approximately 5. This ratio with respect to iron and steel varies from about 8.8 to 14. Gold and silver, however, are not practical metals because of expense. Copper tends to cause rapid deterioration of the rubber, but may be employed if covered with a thin coating of aluminum or other metal which does not attack rubber. Aluminum does not have any deleterious effect upon rubber compositions as it does not react readily with rubber or vulcanizing ingredients ordinarily employed and any small amount of aluminum compounds which may be formed have no deteriorating effect upon the rubber composition.

For heat conductivity only, a malleable or soft aluminum is preferred as it has extremely good resistance to flexing, but the invention also contemplates aluminum alloys such as those having a small percentage of beryllium or lithium, for example $\frac{1}{10}$ to $\frac{1}{2}$%. Such alloys are extremely tough and have high tensile strength and are particularly suitable for the large size metallic filaments contemplated by the present invention which also assist in reinforcing the tire. As stated above, in some instances, it is also desirable to use thin, flat strips of a high tensile strength metal such as iron wire covered with aluminum foil or coated with aluminum so that the wire has an aluminum surface of high heat conducting properties. Even aluminum cased wires of iron or other high tensile strength metal may in some instances be employed in the form of cables. These wires may be twisted into cables with or without center cores or cords of textile fibers or other materials. Cotton or rayon fibers are suitable although a center core of rubber plasticized styrene, polyvinyl butyral or other suitable plastics such as those mentioned above may be employed. Such cables are particularly suitable for use in the beads of the tire although they may be used in small sizes for heat dispersing and reinforcing cords in the body of the tire.

While the invention has been particularly described with reference to pneumatic tire casings, it will be apparent that solid rubber tires or other rubber structures subjected to repeated drastic distortion so as to cause frictional heat generation may have the high heat conducting filaments of the present invention incorporated therein so as to distribute the heat throughout the structure and rapidly conduct the same to the surfaces of the structure for heat dispersion. Such structures may be similar to the wall portion of the tire of Figure 1 or the modifications of such wall structure described with reference to the remaining figures.

It is to be understood that the term "rubber" as employed herein is intended to cover natural or synthetic rubber or rubber-like materials capable of being cured and suitable for making tires or other similar resilient structures subjected to repeated distorting stresses.

While I have disclosed the preferred embodiments of my invention, it is understood that the details thereof may be varied within the scope of the following claims.

I claim:

1. In a pneumatic tire having rubber body and bead portions and provided with flexible reinforcing cords extending substantially helically through said body portion between said bead portions, the combination with a plurality of thin flexible metallic filaments consisting essentially of aluminum also extending continuously and substantially helically through said body portion from one bead portion to the other so as to increase the heat conductivity of said tire, said filaments being composed of creped aluminum foil and having a thickness which is small relative to the width thereof.

2. In a pneumatic tire having a continuous rubber body and bead portions and provided with flexible reinforcing cords extending substantially helically through said body portion between said bead portions, the combination with a plurality of thin, flexible metallic filaments distributed within said rubber body portion and also extending continuously and substantially helically through said body portion from one bead portion to the other so as to increase the heat conductivity of said tire, said filaments consisting essentially of aluminum and being in the form of metallic ribbons having a thickness which is small relative to the width thereof, said filaments being wrapped about individual cords of said flexible reinforcing cords.

3. In a pneumatic tire having a continuous rubber body and bead portions and provided with flexible reinforcing cords extending substantially helically through said body portion between said bead portions, the combination with a plurality of thin, flexible metallic filaments distributed within said rubber body portion and also extending continuously and substantially helically through said body portion from one bead portion to the other so as to increase the heat conductivity of said tire, said filaments consisting essentially of aluminum and being in the form of metallic ribbons having a thickness which is small relative to the width thereof, said filaments being wrapped about individual cords of said flexible reinforcing cords, the convolutions of said filaments about said reinforcing cords being spaced from each other to provide for engagement between said reinforcing cords and said rubber of said body portion.

4. In a pneumatic tire having a continuous rubber body and bead portions and provided with flexible reinforcing cords extending substantially helically through said body portion between said bead portions, the combination with a plurality of thin, flexible metallic filaments distributed within said rubber body portion and also extending continuously and substantially helically through said body portion from one bead portion to the other so as to increase the heat conductivity of said tire, said filaments consisting essentially of aluminum and being in the form of metallic ribbons having a thickness which is small relative to the width thereof, said filaments being wrapped about individual cords of said flexible reinforcing cords, and being covered with a bonding agent to bond said filaments to said rubber of said body portion.

5. In a pneumatic tire having a continuous rubber body and bead portions and provided with flexible reinforcing cords extending substantially helically through said body portion between said bead portions, the combination with a plurality of thin, flexible metallic filaments distributed within said rubber body portion and also extending continuously and substantially helically through said body portion from one bead portion to the other so as to increase the heat conductivity of said tire, said filaments consisting essentially of aluminum and being in the form of metallic ribbons having a thickness which is small relative to the width thereof, said filaments being wrapped about individual cords of said flexible reinforcing cords, and being covered with a synthetic resin bonding agent to bond said filaments to said rubber of said body portion.

6. In a pneumatic tire having a continuous rubber body and bead portions and provided with flexible reinforcing cords extending substantially helically through said body portion between said bead portions, the combination with a plurality of thin, flexible metallic filaments distributed within said rubber body portion and also extending continuously and substantially helically through said body portion from one bead portion to the other so as to increase the heat conductivity of said tire, said filaments consisting essentially of aluminum and being in the form of metallic ribbons having a thickness which is small relative to the width thereof, said filaments being wrapped about individual cords of said flexible reinforcing cords, said filaments being covered with polyvinyl butyral to bond said filaments to said rubber of said body portion.

7. In a pneumatic tire having a continuous rubber body and bead portions and provided with flexible, textile reinforcing cords extending substantially helically through said body portion between said bead portions, the combination with a plurality of thin, flexible metallic filaments distributed within said rubber body portion and also extending continuously and substantially helically through said body portion from one bead portion to the other so as to increase the heat conductivity of said tire, said filaments consisting essentially of aluminum and being in the form of metallic ribbons having a thickness which is small relative to the width thereof, said filaments being wrapped about individual cords of said flexible textile reinforcing cords, and being covered with a bonding agent for bonding said filaments to said rubber of said body portion, the convolutions of said filaments about said reinforcing cords being spaced from each other to provide for engagement between said reinforcing cords and said rubber of said body portion.

8. In a pneumatic tire having a continuous rubber body and bead portions and provided with flexible reinforcing cords extending substantially helically through said body portion between said bead portions, the combination with a plurality of thin, flexible metallic filaments distributed within said rubber body portion and also extending continuously and substantially helically through said body portion from one bead portion to the other so as to increase the heat conductivity of said tire, said filaments consisting essentially of aluminum and being in the form of metallic ribbons having a thickness which is small relative to the width thereof, the thickness of said filaments being between approximately .00015 and .01 inch and the width of said filaments being between approximately 1/64 and 1/4 inch, said filaments being wrapped about individual cords of said flexible reinforcing cords.

JULIAN L. REYNOLDS.

REFERENCES CITED

The following references are of record in the file of this patent:

UNITED STATES PATENTS

| Number | Name | Date |
|---|---|---|
| 1,579,817 | Keith | Apr. 6, 1926 |
| 1,253,259 | Leo | Jan. 15, 1918 |
| 1,983,617 | Ladon | Dec. 11, 1934 |
| 2,343,551 | Harkins | Mar. 7, 1944 |
| 1,457,892 | Blackwelder | June 5, 1923 |
| 2,201,113 | Neal | May 14, 1940 |

FOREIGN PATENTS

| Number | Country | Date |
|---|---|---|
| 409,467 | France | 1910 |
| 443,202 | Great Britain | Nov. 23, 1934 |
| 1,550 | Great Britain | 1905 |
| 19,148 | Great Britain | 1912 |

OTHER REFERENCES

"Handbook of Plastics," by Simonds and Ellis.